United States Patent [19]
Zaidi et al.

[11] Patent Number: 6,065,105
[45] Date of Patent: *May 16, 2000

[54] DEPENDENCY MATRIX

[75] Inventors: Nazar Zaidi, San Jose; Gary Hammond, Campbell; Ken Shoemaker, Los Altos Hills; Jeff Baxter, Cupertino, all of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/780,255

[22] Filed: Jan. 8, 1997

[51] Int. Cl.$^7$ ........................................... G06F 15/00
[52] U.S. Cl. .................. 712/23; 712/218; 712/215
[58] Field of Search ................... 395/391–5, 287, 395/384, 388, 800.23, 800.01, 680, 376; 712/23, 1, 215, 216, 217, 218, 219, 208, 212, 200; 709/300

[56] References Cited

U.S. PATENT DOCUMENTS

| | | | |
|---|---|---|---|
| 5,574,941 | 11/1996 | Horst | 395/391 |
| 5,655,096 | 8/1997 | Branigin | 395/376 |
| 5,761,476 | 6/1998 | Martell | 395/395 |

OTHER PUBLICATIONS

Ramon Delf Acosta, Evaluation, Implementation, And Enhancement of the Dispatch Stack Instruction Issuing Mechanism, UMI Dissertation Services, 16–17, 30–40, 1985.

Primary Examiner—Larry D. Donaghue
Attorney, Agent, or Firm—Charles A. Mirho

[57] ABSTRACT

In a microprocessor, an instruction scheduler 30 includes a dependency matrix 36 and a waiting buffer 34. A dependency determination unit 32 receives instructions to be executed, forwards the instructions to the waiting buffer 34, determines if any dependency exists between the instructions, and forwards the dependency information to the dependency matrix 36 in the form of a dependency vector 40. The dependency matrix 36 periodically determines whether any of the instructions contained in the waiting buffer 34 are ready to be executed, that is, no dependencies exist for that instruction. As each instruction is dispatched for execution from the waiting buffer 34, the dependency vector 40 for all dependent instructions is cleared for subsequent execution. In this manner, an out-of-order processing scheme is implemented that efficiently accounts for data dependency between processed instructions.

16 Claims, 6 Drawing Sheets

DEPENDENCY MATRIX

BACKGROUND OF THE INVENTION

1. Field of the Invention

The present invention relates generally to scheduling instructions for execution within a microprocessor, and, more particularly, to determining when these instructions are ready for execution prior to scheduling.

2. Description of the Related Art

A scheduler is the part of a microprocessor that is responsible for scheduling instructions for execution within a microprocessor's execution units. As a part of scheduling instructions, the scheduler preferably determines when an instruction is ready to be scheduled for execution. For purposes of this invention, the terms "scheduling for execution" and "scheduling for dispatch" are synonymous. One factor that affects whether an instruction is ready is the availability of resources, such as an execution unit. In present day microprocessors, there are different types of execution units, and each execution unit may generally execute only certain types of instructions. It is the scheduler that ascertains what type of instructions are ready for execution and whether execution units that may process these types of instructions are available.

Another factor that affects whether an instruction is ready for execution is whether the instruction's sources are available. An instruction's sources are the data that the instruction requires before it can be executed. An instruction is said to be dependent on earlier instruction when it cannot be executed until the earlier instruction has been executed. An example of this is when a first instruction calculates or stores results that are to be utilized by a later instruction. In this case, the later instruction cannot be scheduled for execution until the first instruction has executed. This dependency of a later instruction on data derived from an earlier instruction is commonly referred to as data dependency.

Prior microprocessors have addressed these scheduling issues with a device called a reservation station. A reservation station holds instructions while they await execution. Along with each instruction, the reservation station has a location that holds the instruction's source addresses. A source address is the address of the storage location from which the instruction's data will be transferred. Furthermore, the reservation station has a "ready" field that indicates when the source address is valid. Using such a reservation station, it is possible to accommodate the data dependencies discussed above. When an instruction requires the results of an earlier instruction, the valid bit for its source address is not set until it is determined that the prior instruction has stored its results in the storage location. Once an instruction's source addresses are valid, the instruction is ready to be dispatched for execution. This type of dependency is also called "source" or "data" dependency.

In today's high speed microprocessors, this reservation station approach has undesirable limitations. One of the problems is that each entry in the reservation station that is dependent on an earlier instruction is required to watch, or "snoop", the output of the execution units to determine when its sources are available. Furthermore, once it determines that its sources are valid, it then takes time to schedule the instruction for execution. It would be desirable to have a scheduler that knew when instructions were ready to be dispatched without having to snoop the output of the execution units.

Another problem with the approach discussed above is that a lag is created between a dependent instruction and the instruction upon which it is dependent The lag is created as follows: after an instruction executes, its results appear on the output bus of the execution unit. The reservation station watches this bus to determine when any required sources become available. If the output of the execution unit is required by an entry in the reservation station, the source bit for that entry is set. Once all source bits are set, an entry is ready to be dispatched for execution. There is a time lag between when the source data is generated by the execution unit and the time that the dependent instruction is considered ready. This time lag can easily constitute several clock cycles. It would be desirable to have a scheduler that knew how long it would take after a first instruction is dispatched for execution to be complete.

The present invention is directed to overcoming, or at least reducing the affects of, one or more of the problems set forth above.

SUMMARY OF THE INVENTION

In accordance with one aspect of the present invention, a method is provided for scheduling an instruction for dispatch to an execution unit. A first instruction is stored in a first location within a waiting buffer. Likewise, a second instruction, dependent on the first instruction, is stored in a second location within the waiting buffer. A dependency vector is generated for the second instruction, wherein the dependency vector has a bit set that indicates the second instruction is dependent on the first instruction. Thereafter, the first instruction is dispatched for execution, and the set bit in the dependency vector is cleared in response to the first instruction being dispatched. Finally, the second instruction is dispatched after the set bit in the dependency vector is cleared.

BRIEF DESCRIPTION OF THE DRAWINGS

The foregoing and other advantages of the invention will become apparent upon reading the following detailed description and upon reference to the drawings in which.

Figure 1A:
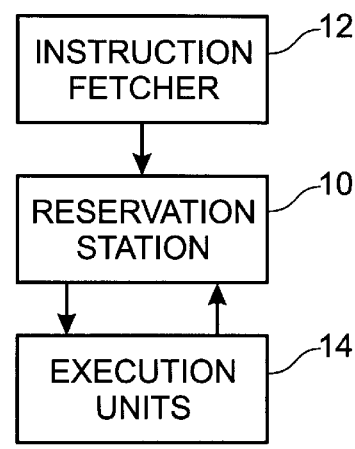
FIG. 1A depicts a prior art system that utilizes a reservation station.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention defined by the appended claims.

DETAILED DESCRIPTION OF SPECIFIC EMBODIMENTS

The Prior Art

Turning now to the drawings and referring initially to FIG. 1A, a typical prior art system utilizing a reservation station 10 is shown. The reservation station 10 receives instruction from a fetcher 12. When an instruction is ready to be dispatched for execution, it leaves the reservation station 10 and goes to execution units 14. Each instruction contained within the reservation station 10, that is dependent upon an earlier instruction, snoops the output of the execution units 14 until it sees the data it requires. Upon this occurrence, the data is written into the source field of the reservation station.

Figure 1B:
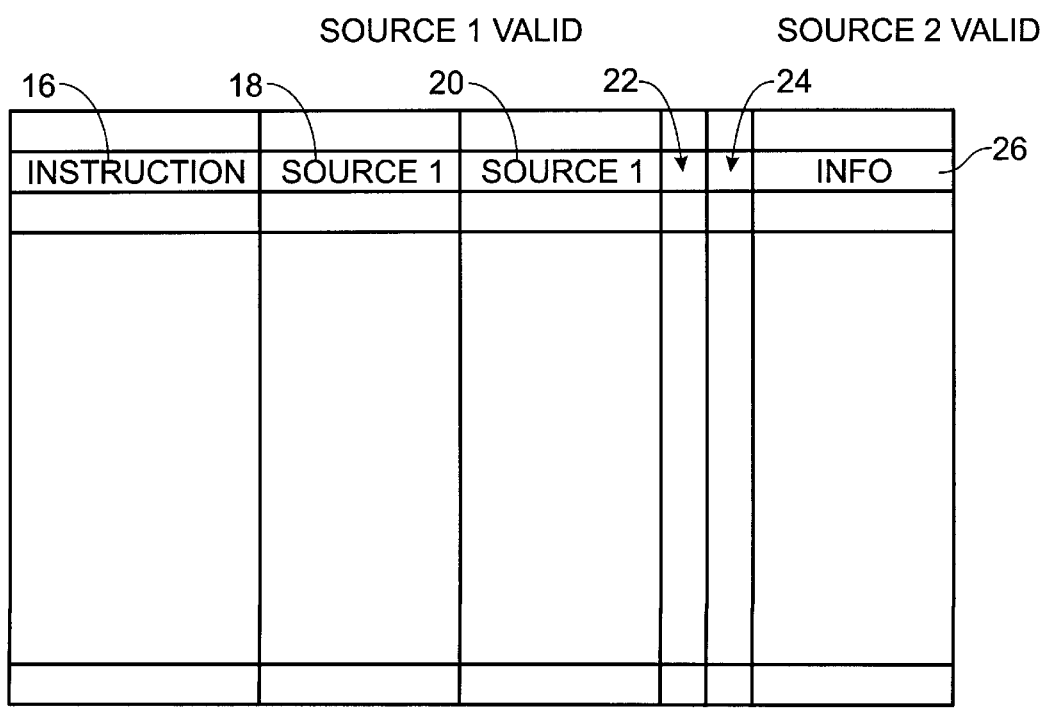
FIG. 1B depicts a typical prior art reservation station and the various fields in each entry.

Now turning to FIG. 1B, a more detailed representation of the prior art reservation station 10 is depicted. Each entry in the reservation station 10 is comprised of an executable instruction 16, two source fields 18, 20, two source valid fields 22, 24, and an information field 26.

An instruction 16 can require either one or two sources 18, 20. If an instruction is dependent upon an earlier instruction, its source data will not be ready until the earlier instruction is executed. The reservation station 10 handles this by storing the address of the source that is not ready in one of the source fields 18, 20. Additionally, the corresponding source valid bit 22, 24 will indicate that the source data is not valid.

When an instruction 16 is being executed, it contains the address of where the execution results need to be stored. As the instruction 16 is executed, the address of where the results need to be stored is broadcast out of the execution unit 14. The reservation station 10 monitors these outputs to determine whether the broadcast address matches the address contained within any of the source fields 18, 20. If a match occurs, the source valid bit 22, 24 for that source field 18, 20 is set. In this manner, the source valid entry within the reservation station 10 identifies the data required for execution as being available.

The problem with this approach is that there is lost opportunity to send a dependent instruction for execution. For example, assume that there is a first instruction ready for execution and a second instruction dependent upon the first instruction. The first instruction is sent for execution while the second waits in the reservation station 10. After the first instruction is done executing, the execution unit 14 broadcasts the address of where the results are to be written. The reservation station 10 snoops and determines that one of its entries, the second instruction, needs these results as one of its sources. The valid bit 22, 24 for that source 18, 20 is set, and the reservation station 10 then recognizes that this second instruction is now ready to be scheduled for dispatch.

It would enhance the speed of operation of the microprocessor if the reservation station knew in advance how long the first instruction was going to take for execution and scheduled the second instruction for execution that amount of time after the first instruction. In this manner, the second instruction could be scheduled for execution without having to snoop the output of the execution unit and without the time delay involved with ascertaining whether the reservation station 10 needs the output of the execution unit and the associated delays with setting the valid bits 22, 24.

The Present Invention

Figure 2:
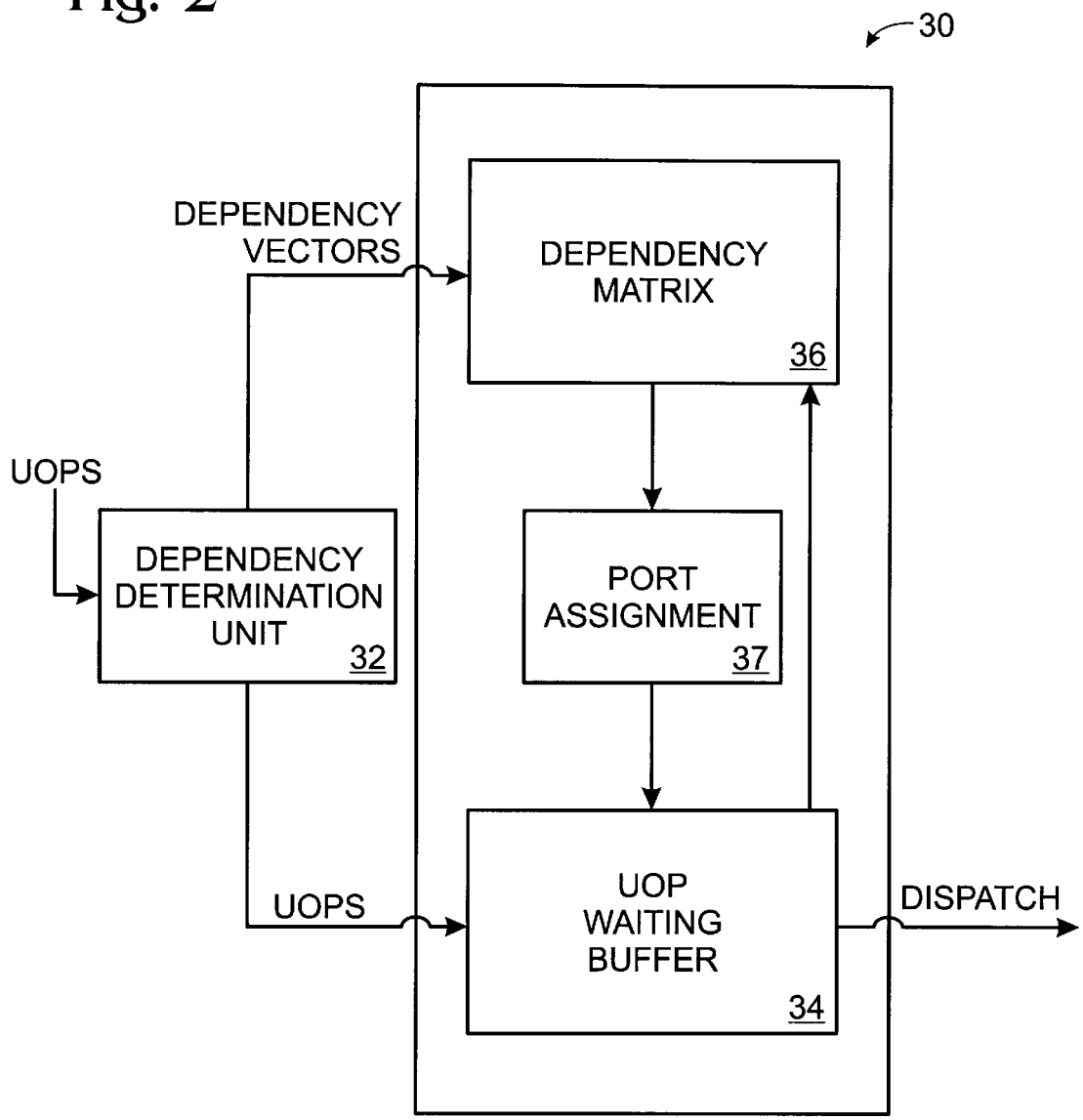
FIG. 2 is a general block diagram of a scheduler.

Turning now to FIG. 2, a block diagram depicting an instruction scheduler 30 of the present invention is shown. For purposes of this invention, the term micro-op is synonymous with the term instruction used above. The present invention will first be discussed at the high level shown in FIG. 2 and then each individual unit of FIG. 2 will be discussed in greater detail in conjunction with FIGS. 3–7, as needed.

Micro-ops enter the scheduler 30 through a Dependency Determination Unit (DDU) 32. The DDU 32, as its name implies, ascertains whether any of the incoming instructions are dependent upon any of the earlier instructions. This is a procedure that is known in the art and is not discussed in detail herein so as to avoid obscuring the present invention. For purposes of understanding the present invention it is sufficient to appreciate that the DDU 32 operates in a known manner to determine if each instruction depends upon the result of any earlier instruction and communicates any such dependencies in the form of a dependency vector.

The DDU 32 passes each micro-op it receives to a micro-op waiting buffer 34. In the present invention, the micro-op waiting buffer 34 is capable of holding 32 micro-ops simultaneously. The specific number of entries, however, may be varied without departing from the spirit and scope of the present invention.

As the micro-op is sent to the waiting buffer 34, the DDU 32 sends the dependency vector for that micro-op to a Dependency Matrix 36. Briefly, the dependency vector indicates which micro-ops, if any, in the waiting buffer 34 that the present micro-op is dependent upon. The dependency vector consists of at least as many bits as the waiting buffer 34 has entries. In the present invention, the dependency vector is 32 bits long because the waiting buffer holds 32 entries. For example, if the present micro-op is dependent on the micro-ops in entries two and twelve in the waiting buffer 34, the dependency vector for the present micro-op will have bits two and twelve set, while the rest of the bits will be zero. When all 32 bits in a micro-op dependency vector are "0," that micro-op is said to be ready for dispatch.

In the present invention, as each micro-op is scheduled for dispatch out of the waiting buffer 34, the dependency matrix 36 generates a "column clear" signal to clear all bits representative of that instruction. In other words, when the micro-op in position two is dispatched out of the waiting buffer 34, the column clear signal is sent to the Dependency Matrix 36, clearing bit two in all dependency vectors. A micro-op is said to be ready for execution when all the bits in its dependency vector are zero. Once a micro-op is ready, the scheduler 30 ascertains whether there are available resources, such as an available execution unit, to execute the micro-op. The port assignment logic 37 is responsible for assigning execution resources as each micro-op becomes ready for execution. When the micro-op is dispatched, the dependency matrix 36 generates the column clear signal, and the cycle begins again.

Now, for a more detailed description as to how the present invention functions, each unit shown in FIG. 2 will be discussed in greater detail, as needed.

The Dependency Determination Unit

The DDU 32 of the present invention works as follows: the DDU 32 receives in-order micro-ops from a fetcher (not shown) and then allows for the re-ordering of the micro-ops based on information such as data dependencies, latency times, and execution resource availability. Re-ordering the micro-ops requires renaming logical destinations to physical destinations in order to avoid artificial dependencies created due to write-after-write and write-after-read hazards. An example of a write-after-write dependency is as follows: assume that two instructions are received that both write to register EAX. If register renaming is not implemented, when the second write instruction is executed, the first value will be overwritten and no longer available to a later instruction that requires this data. Register renaming allows this dependency to be removed by changing the logical destination EAX of the two instructions to two different physical registers in the processor. In this manner, both instructions may be executed in-order or out-of-order, and the instructions will write their values to two different physical registers. The renaming portion of the processor keeps track of this. Register renaming is discussed in detail in a copending, commonly owned application entitled "Register Renaming With Segment Registers" by Kin-Yip Liu, Ken Shoemaker, Amand Pai, and Gary Hammond, filed on Dec. 30, 1996. The DDU 32 provides this dependency information about each of the micro-ops to the dependency matrix 36.

The waiting buffer 34 has 32 locations in which micro-ops are stored while they wait to be dispatched for execution. Each micro-op is assigned to one of these locations upon leaving the DDU 32. The location to which the micro-op is assigned is represented as a 32 bit vector that is all zeros, except for a single "1" bit which corresponds to the location to which the micro-op is assigned. For example, if the micro-op is assigned to location 18 in the waiting buffer, its scheduler vector will be a 32 bit vector in which all bits are "0" except for bit 18 which will be set to "1".

Each micro-op is also assigned a dependency vector. This vector is also 32 bits long, the same number as the number of locations in the waiting buffer 34. If bit 12 is set to "1" in a micro-ops dependency vector, then the corresponding micro-op is dependent on the micro-op stored in location 12 of the waiting buffer 34. Although there is only one non-zero bit in a micro-ops scheduler vector, there can be a plurality of bits set to the value of "1" in a micro-op's dependency vector. For example, if the DDU 32 determines that a micro-op is dependent on micro-ops stored in locations 2 and 12 of the waiting buffer 34, then its dependency vector will be:

00000000000000000000100000000010.

Once the register renaming has been performed and the dependency vector produced, the micro-op is sent to the waiting buffer 34 while the micro-op's dependency vector is sent to the Dependency Matrix 36.

Dependency Matrix

Figure 3:
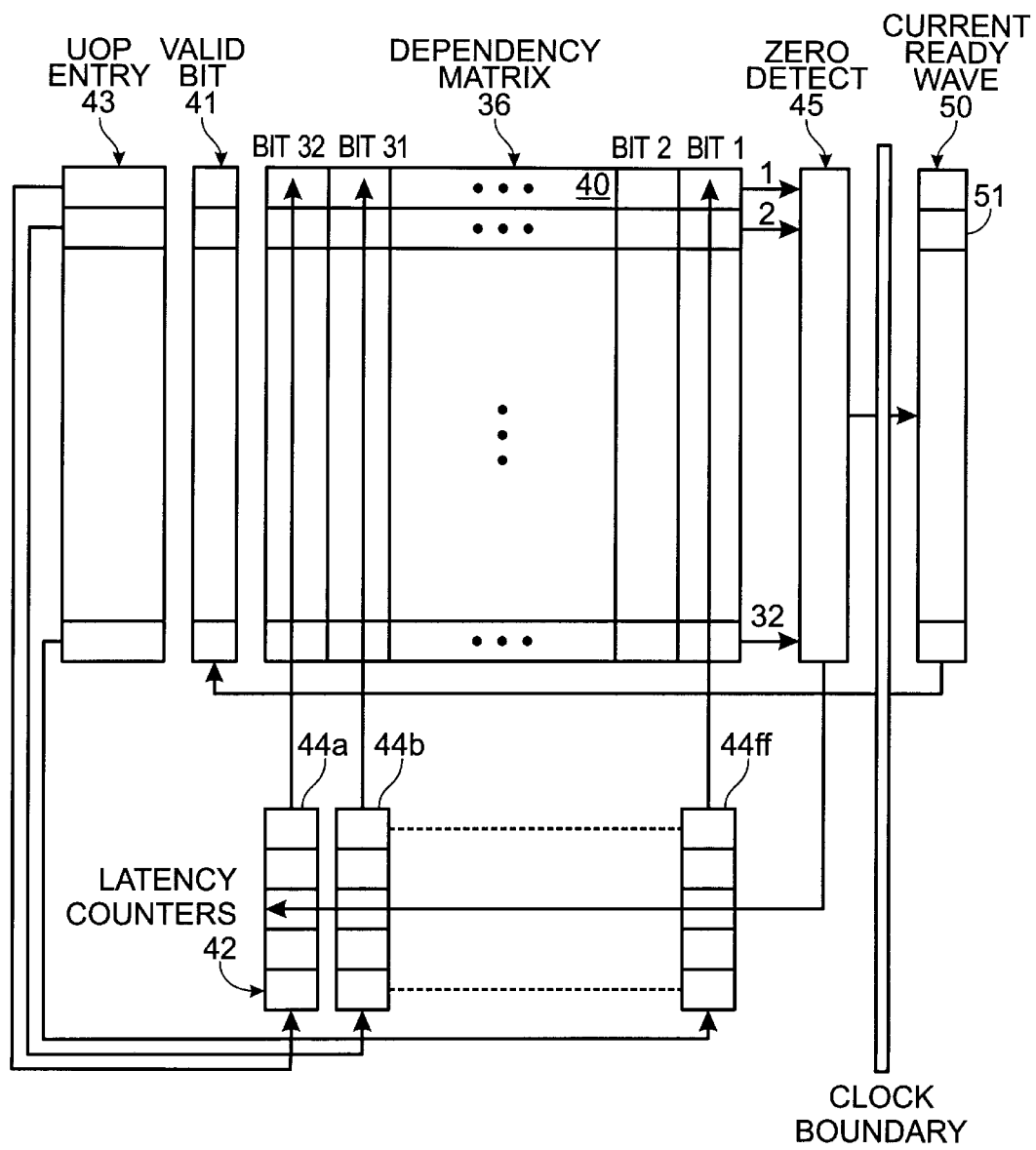
FIG. 3 is a more detailed view of a dependency matrix.

Turning now to FIG. 3, the Dependency Matrix 36 of the present invention is shown. The Dependency Matrix 36 holds the dependency vectors 40 and latency counters 42 for each of the thirty-two micro-ops in the waiting buffer 34. (The latency counters will be discussed later.) The other entries in the Dependency Matrix 36 are the Valid bit 41, and the Micro-op entry 43, which is seven bits.

As can be seen from FIG. 3, the core of the Dependency Matrix 36 is a 32×32 bit array. The array has 32 entries, the same number of entries as the waiting buffer 14, and each of these 32 entries are 32 bits in length. The size of the array is purely a design choice and a different size array may be more suited for a different microprocessor.

As stated above, when all the bits of a dependency vector are "0", the associated micro-op in the waiting buffer 34 is no longer dependent on any stored instructions and can be scheduled for dispatch. Zero-detection circuitry 45 is built into each line to produce a "ready generation" signal, indicating that the corresponding micro-op is ready to be executed.

Although it would be possible to schedule an instruction for dispatch once all the bits of its dependency vector 40 are "0", the latency counters 42 further enhance performance.

For example, assume that micro-op 1 requires two clock cycles to execute and that micro-op 2 is dependent on the results of micro-op 1. Although micro-op 2 can be dispatched one clock cycle after micro-op 1 is dispatched, micro-op 2 will stall for one clock cycle until micro-op 1 is finished executing. This can result in a performance penalty. To reduce pipeline stalls, the Dependency Matrix 36 also contains the latency counters 42.

The latency counters 42 are five-bit shift registers 44a–44ff that have a bit set, indicating how many clock cycles should be allowed to pass before clearing that particular column of the array. For example, assume that the dependency vector 40 in entry 31 indicates that the micro-op in location 31 of the waiting buffer 34 is ready to be dispatched. Also assume that micro-op entry 43 associated with micro-op 31 indicates that micro-op 31 is of the type that will take three clock cycles to execute. In other words, any instructions dependent on micro-op 31 should preferably be scheduled after the next three clock cycles. Once micro-op 31 is scheduled, the shift register 44b coupled to column 31 of the array has its third bit set and the shift register 44b is allowed to begin shifting based on an input from the zero-detection circuitry 45. Three clock cycles later, the shift register 44b will clear all bits in column 31. In this manner, the Dependency Matrix 36 compensates for a micro-op's execution latency. This allows the scheduler 30 to not have to snoop the output of the execution units 14, as discussed above.

In the special case of instructions that require only a single clock cycle to execute, performance of the scheduler 30 can be further enhanced by shifting the latency counters 42 early. That is, ordinarily the zero detector 45 begins assembling the next wave vector 50 before the next latency shift occurs. Thus, for those instructions dependent on any single cycle instructions present in the previous wave vector 50, they would not be placed in a wave vector 50 until the second clock even though they were actually available to be dispatched at the first clock. To prevent a minimum 2-cycle latency, the latency counters 42 for all micro-ops in a new wave are shifted speculatively as soon as a new wave vector is accepted into the new wave latch 51.

As previously stated, the latency shift registers 44a–44ff are not necessary to implement the present invention, but operate to further enhance its performance. As mentioned above, the shift registers 44a–44ff begin shifting when a micro-op is scheduled for dispatch, not when the micro-op is actually dispatched. This is elaborated upon more fully below in the section dealing with the operation of the invention.

The Micro-Op Waiting Buffer

The micro-op waiting buffer 34 is a buffer that holds up to 32 micro-ops that are waiting to be executed. Along with the micro-op, the waiting buffer 34 also holds additional bookkeeping information for each of the entries. Contrary to the reservation stations 10 in the prior art, the micro-op waiting buffer 34 does not contain any source fields.

Operation of the Present Invention

During each clock cycle, the scheduler 30 searches for ready micro-ops. A ready micro-op is one whose dependencies have been satisfied, resulting in a dependency vector with a 0 value. The Ready logic that ascertains whether all bits in a dependency vector 40 are zero consists of the dedicated zero-detect circuits 45 built into each entry in the array. The Ready logic takes into account both the state of the dependency vector and any modifications made to the dependency vector by a simultaneous "column clear" signal in the array. The "column clear" signal was discussed above in connection with the latency counters 42.

Generally, there will be several ready micro-ops each clock cycle. This set of ready micro-ops is called a wave. It must be understood that this search takes place in the Dependency Matrix 36, and the actual micro-ops residing in the waiting buffer 34 are not disturbed.

The output of this ready search is a 32 bit wave vector 50 that indicates which of the 32 micro-ops are ready for dispatch. For example, if micro-ops 3, 12, and 20 are ready, the wave vector will be a 32 bit vector with only bits 3, 12, and 20 set to a value of "1".

There are times, however, when there will be more ready micro-ops than there are available resources. However, one wave of ready micro-ops should not be allowed to mix with a later, second wave of micro-ops. The reason for this is that the second wave of micro-ops may include an instruction that is dependent on an instruction in the first wave. Keeping these waves from mixing prevents a dependent instruction from being issued simultaneously with an instruction on which it depends.

Assume, for example, that micro-op 1 is scheduled for dispatch and it has a latency of one clock cycle and that micro-op 2 is dependent on micro-op 1. As explained above, with the implementation of the latency shift registers 44a–44ff, micro-op 2 will be ready one clock cycle after micro-op 1. This will result in micro-op 2 being included in the wave following the wave including micro-op 1. If these two waves are allowed to mix, micro-ops 1 and 2 could be actually dispatched in the same wave. For this reason, the scheduler 30 will not accept a second wave of ready micro-ops until all micro-ops in the preceding wave have been actually dispatched.

Once the wave vector 50 for the present clock cycle is produced, it is latched and the scheduler 30 ascertains whether resources are available so that all micro-ops in the present wave can be dispatched. Once a micro-op has been accepted into the New Wave Latch 51, it is necessary to clear the micro-op's valid bit in the Dependency Matrix so that it will not be found ready again. Clearing the valid bits occurs at the same time as the column clear, and is effected by delivering the wave vector 50 to clear inputs associated with the valid bits 41.

Figure 4:
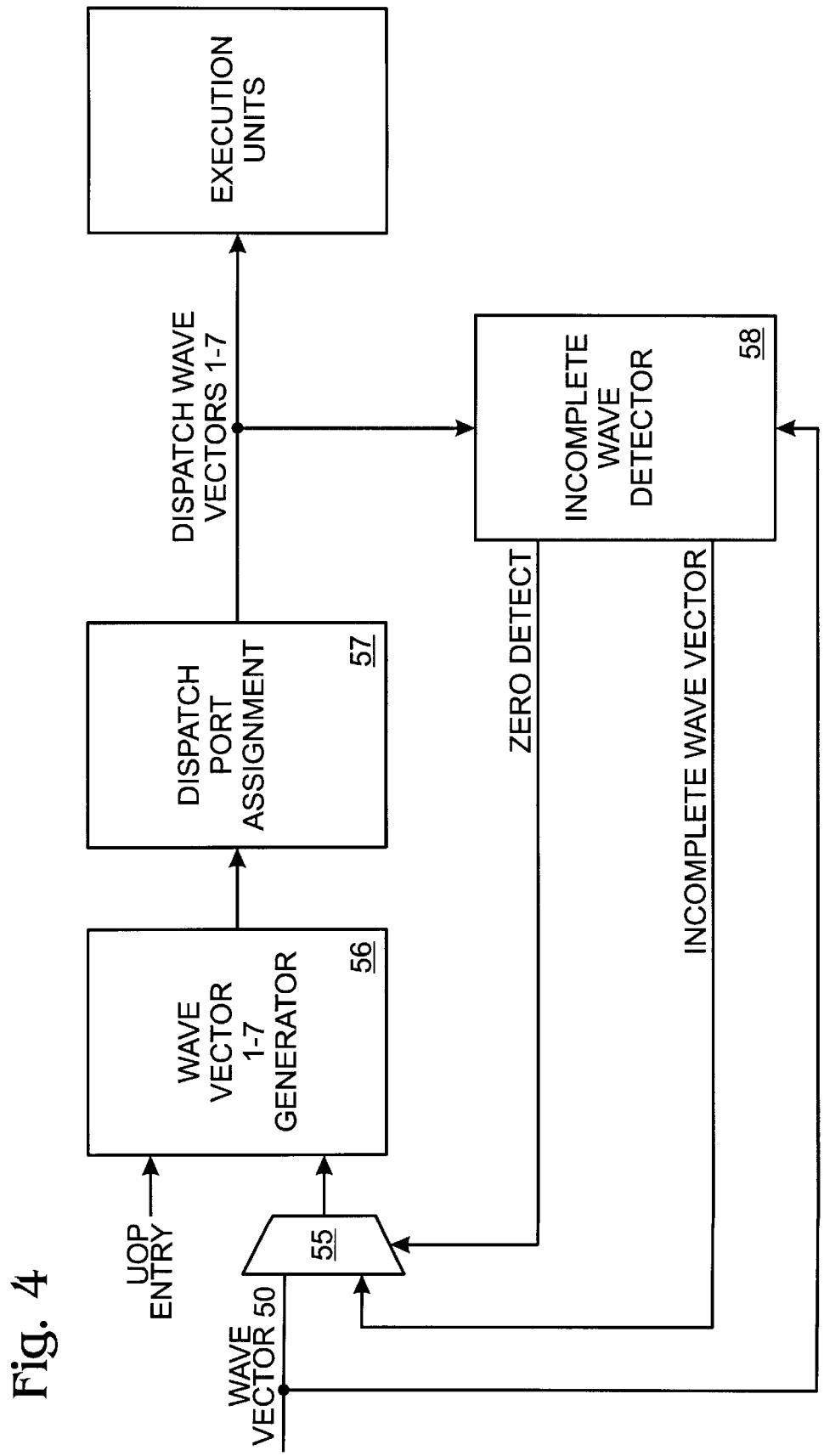
FIG. 4 is a block diagram of a port assignment circuit.

Generally, the port assignment logic 37 in FIG. 2 assigns execution resources to the micro-ops in a wave. FIG. 4 shows a block diagram of the organization and structure of the port assignment logic 37. The first task for the port assignment logic 37 is to choose a wave. The port assignment logic 37 may assign dispatch ports to either a new wave or it may continue to assign dispatch ports to the remains of an old wave that it was unable to dispatch completely in the previous clock. The new wave consists of the next wave vector 50, and the old wave consists of the remains of the previous wave vector 50. Both the new and old waves are delivered to a multiplexer 55. One of the old and new wave vectors is selected and delivered to a generator 56 that produces resource-specific wave vectors for each of 7 available dispatch ports. The 7 wave vectors are delivered to a dispatch port assignment circuit 57, which determines how many, if not all, of the micro-ops are sent to the 7 dispatch ports to be executed. The micro-ops actually dispatched are compared to those identified in the original wave vector 50 by an incomplete wave detector 58. If a match is found, indicating all micro-ops have been dispatched, a zero detect signal is delivered to a select input of the multiplexer 55 to select the next wave vector 50. If, however, not all of the micro-ops were dispatched, then an incomplete wave vector is produced, and the zero detect signal causes the multiplexer 55 to deliver the incomplete wave vector to the wave vector generator 56. This process repeats until all micro-ops in the original wave vector 50 have been dispatched.

Figure 5:
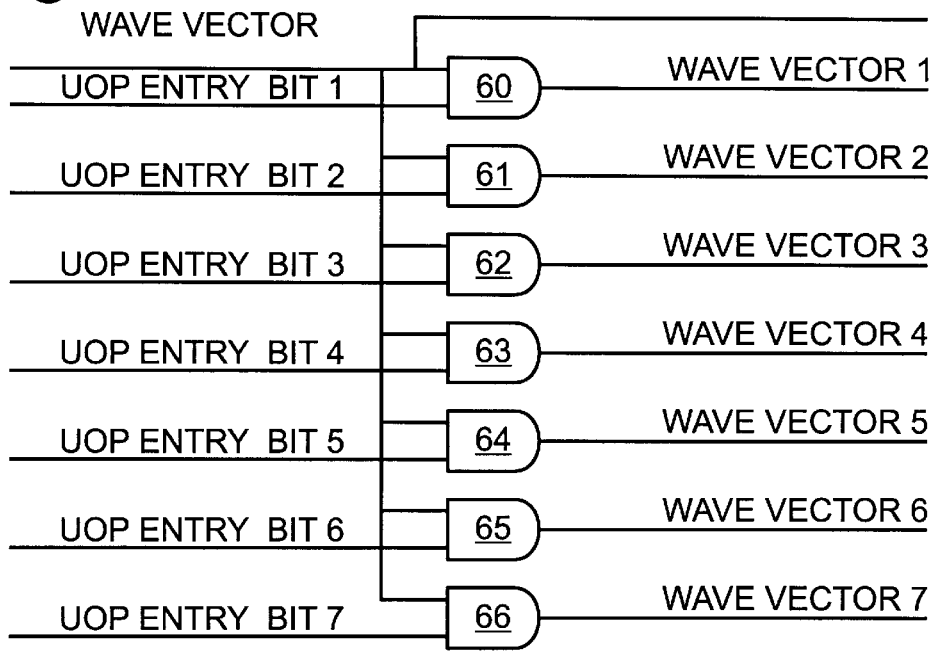
FIG. 5 is a schematic of the circuitry used to generate a set of wave vectors.

Turning now to FIG. 5, a portion of the circuitry of the wave vector generator 56 used to generate resource-specific waves is shown. In the microprocessor of the instant invention there are seven dispatch ports that may simultaneously receive instructions to be executed. Accordingly, the port assignment circuitry 37 develops seven corresponding 32-bit wave vectors, one for each available port.

Each of the seven bits of the micro-op entry 43 are combined in a set of AND gates 60–66 with the wave vector 50. The outputs of the AND gates 60–66 form one bit for each of the wave vectors 1–7. It should be appreciated that FIG. 5 illustrates the circuitry needed to generate one bit of each of the wave vectors 1–7, and that similar circuitry is repeated 32 times to produce each of the bits in the wave vectors 1–7. Using this circuitry, the wave vectors 1–7 will contain a value of "1" in those locations corresponding to micro-ops contained in the waiting buffer 34 that can be sent to the corresponding dispatch port. For example, assume that the wave vector 50 indicates that micro-ops in locations 2 and 12 are ready to be dispatched and that their micro-op entries 43 indicate that micro-op 2 should be sent to dispatch port 1 and micro-op 12 should be sent to dispatch port 6. Thus, wave vector 1 will have only bit 2 asserted and wave vector 6 will have only bit 12 asserted. The remaining wave vectors will have no bits set.

It is possible that not all of the micro-ops contained within the wave vectors 1–7 can be executed at the same time, but rather, may need to be scheduled serially. However, in no event are micro-ops contained in the current wave allowed to be mixed with micro-ops in the preceding or following waves, so as to avoid data dependency problems.

The actual method and circuitry used for determining the order in which the micro-ops represented in wave vectors 1–7 will be dispatched has no effect on the operation of the instant invention, and consequently will not be discussed in detail herein. For a proper understanding of the instant invention it is sufficient to appreciate that the 7 dispatch ports may be unable to handle all of the micro-ops contained in the wave vectors 1–7. Accordingly the dispatch port assignment circuitry 57 is capable of analyzing the micro-ops currently scheduled for execution and determining which micro-ops should be sent to which dispatch ports. The output of this circuitry is a set of seven 32-bit dispatch wave vectors 1–7, each of which has, at most, only a single bit set.

Figure 6:
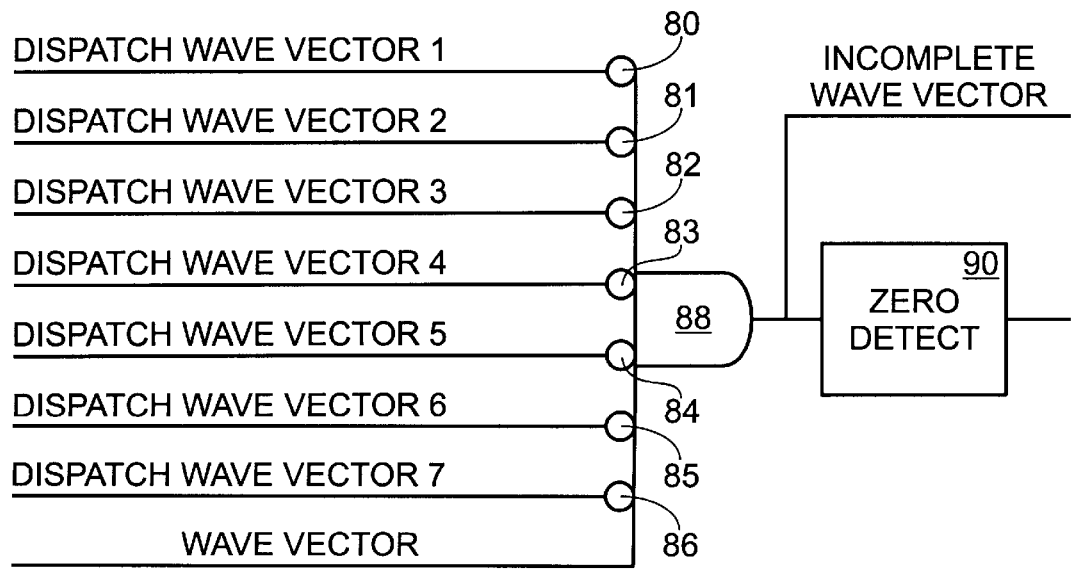
FIG. 6 is a schematic of the circuitry used to determine if the entire wave has been dispatched.

Since only one wave at a time is allowed to be executed, and not all the micro-ops in a wave may necessarily be executed at the same time, the detector 58 is needed for determining if all of the identified micro-ops in the wave vector 50 have been dispatched. The detection circuitry for accomplishing this is shown in FIG. 6. Each of the seven dispatch wave vectors 1–7 are delivered through inverters 80–86 to an AND gate 88. The eighth input to the AND gate 88 is the original wave vector 50. The AND gate 88 will produce a "1" at its output when the micro-op has been identified in the original wave vector 50, but not in one of the dispatch wave vectors 1–7. Thus, the output of the AND gate 88 contains a "1" at each bit location for which a micro-op has been identified in the original wave vector 50, but not yet dispatched for execution. That is, the output of the AND gate 88 is a 32-bit incomplete wave vector that should be processed again prior to scheduling a new wave.

A zero detect circuit 90 also receives the output of the AND gate 88 and determines if any unexecuted micro-ops still exist in the original wave vector 50 by the presence of any "1" values. The output of the zero detection circuit 90 is used as a select input to the multiplexer 55 that receives the original wave vector 50 and the incomplete wave vector. Thus, in instances where not all the micro-ops identified in the original wave vector 50 can be executed at the same time, the zero detection circuit recycles the incomplete wave vector rather than use a new wave vector 50. In this manner, micro-ops associated with adjacent waves are not mixed.

Figure 7:
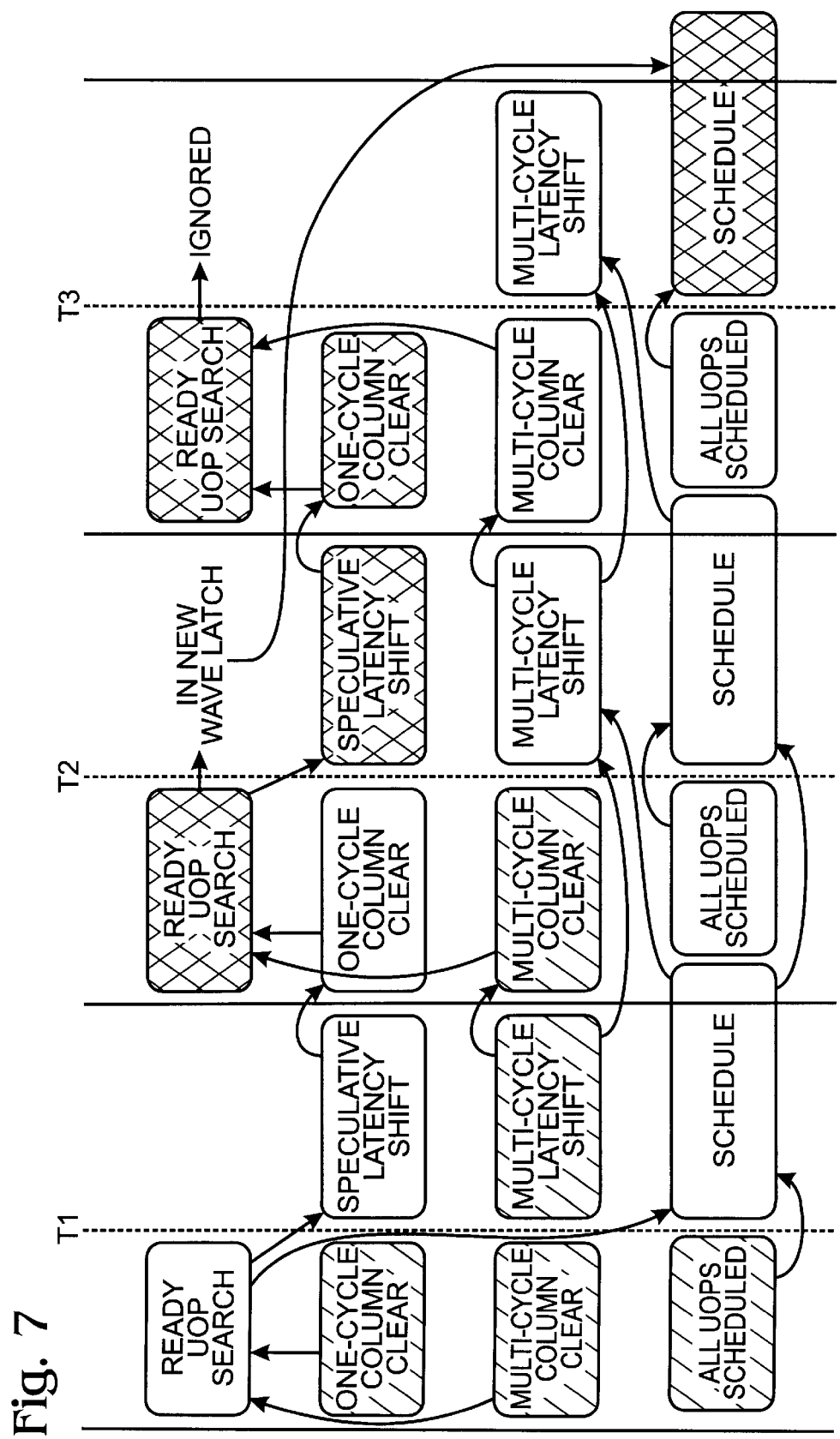
FIG. 7 is a timing diagram depicting the timing of the signals in the present invention.

The overall operation of the scheduler 30 may be described by reference to the timing diagram contained in FIG. 7. The timing diagram of FIG. 7 is shown broken into three clock periods T1, T2, and T3. In clock T1, the scheduler searches for ready micro-ops, finds some, and advances them on to the scheduler 30. In the second half of T1, the latency shift registers of the newly-ready micro-ops are shifted once. This latency shift results in a column clear in the first half of T2. In the meantime, in the second half of T1 and the first half of T2, the scheduler 30 assigns dispatch ports to as many micro-ops as possible.

In clock cycle T2, the ready micro-op logic again searches for and finds a wave of ready micro-ops. These are latched into the new wave latch 51. In the second half of T2, speculative latency shift for the new wave is performed. In the first half of T3, column clear is performed.

If at the end of the first half of clock T2, the scheduler discovers that is was unable to assign dispatch ports to all micro-ops in the first wave, then the dispatch port assignment process that takes place in the second half of T2 and the first half of T3 is still associated with the old wave; the new wave sits unused in the new wave latch 51.

In clock T3, the ready micro-op search turns up a new wave of micro-ops. However, because the zero detector 90 has determined that not all of the micro-ops were dispatched, the new wave is ignored, and there is no speculative latency shift or column clear. Also in T3, the dispatch port logic 37 finds that it has completed the old wave and begins processing of the wave already in the new wave latch 51.

What is claimed is:

1. A method for scheduling an instruction for dispatch to an execution unit, said method comprising:
    storing a first instruction in a first location within a waiting buffer;
    storing a second instruction, dependent on the first instruction, in a second location within the waiting buffer;
    generating a dependency vector for the second instruction, wherein the dependency vector has a bit set that indicates the second instruction is dependent on the first instruction;
    dispatching the first instruction for execution;
    clearing the set bit in the dependency vector in response to the first instruction being dispatched and prior to determination of source operands of the second instruction; and
    dispatching the second instruction after the set bit in the dependency vector is cleared.

2. The method of claim 1 further comprising the step of: delaying the dispatch of the second instruction by a preselected period of time corresponding to a length of time estimated for execution of the first instruction.

3. The method of claim 2, wherein the step of delaying the dispatch of the second instruction includes the steps of:
    loading a shift register with a value corresponding to the preselected period of time; and
    periodically clocking said shift registers so that said shift register delivers a clear signal to the dependency vector after said preselected period of time.

4. The method of claim 3, wherein the step of periodically clocking said shift registers includes clocking the shift registers in advance of the clocking period immediately after the first instruction is dispatched.

5. An instruction scheduling apparatus, said apparatus comprising:
    a dependency determination unit adapted to receive a plurality of instructions, determine that a second one of said instructions is dependent on a first one of said instructions, and generate dependency vectors for each instruction wherein the dependency vector for the second one of said instructions has a bit set that represents that the second one of said instructions is dependent on the first one of said instructions;
    a waiting buffer coupled to the dependency determination unit and adapted to receive said plurality of instructions and to store said instructions pending dispatch for execution; and
    a dependency matrix coupled to the dependency determination unit and adapted to receive and store said dependency vectors, to schedule the first one of said instructions for execution in response to the corresponding dependency vector having no bits set, and to clear the dependency vector of the second one of said instructions in response to the first one of said instructions being scheduled and prior to determination of source operands of the second instruction.

6. An apparatus, as set forth in claim 5, wherein said dependency matrix includes a zero detect circuit coupled to the dependency vector of the first one of the instructions, and adapted to deliver a clear signal to the dependency vector of the second one of the instructions in response to determining that no bits are set in the dependency vector of the first one of the instructions.

7. An apparatus, as set forth in claim 6, wherein said dependency matrix includes a latency counter coupled to the zero detect circuit and adapted to receive the clear signal and delay its delivery to the dependency vector by a period of time corresponding to a length of time estimated for execution of the first one of the instructions.

8. An apparatus, as set forth in claim 7, wherein said latency counter includes a multi-bit shift register having its output coupled to a clear input of the dependency matrix, and an enable input coupled to the zero detect circuit, said latency counter adapted for being loaded with a value corresponding to the length of time estimated for execution of the first one of the instructions in response to receiving the clear signal.

9. An apparatus having a microprocessor capable of executing instructions stored in an external memory, said apparatus comprising:
    a dependency determination unit adapted to receive a plurality of instructions, determine that a second one of said instructions is dependent on a first one of said instructions, and generate dependency vectors for each instruction wherein the dependency vector for the second one of said instructions has a bit set that represents that the second one of said instructions is dependent on the first one o said instructions;

a waiting buffer coupled to the dependency determination unit and adapted to receive said plurality of instructions and to store said instructions pending dispatch for execution; and a dependency matrix coupled to the dependency determination unit and adapted to receive and store said dependency vectors, to schedule the first one of said instructions for execution in response to the corresponding dependency vector having no bits set, and to clear the dependency vector of the second one of said instructions in response to the first one of said instructions being scheduled and prior to determination of source operands of the second instruction.

10. An apparatus, as set forth in claim 9, wherein said dependency matrix includes a zero detect circuit coupled to the dependency vector of the first one of the instructions, and adapted to deliver a clear signal to the dependency vector of the second one of the instructions in response to determining that no bits are set in the dependency vector of the first one of the instructions.

11. An apparatus, as set forth in claim 10, wherein said dependency matrix includes a latency counter coupled to the zero detect circuit and adapted to receive the clear signal and delay its delivery to the dependency vector by a period of time corresponding to a length of time estimated for execution of the first one of the instructions.

12. An apparatus, as set forth in claim 11, wherein said latency counter includes a multi-bit shift register having its output coupled to a clear input of the dependency matrix, and an enable input coupled to the zero detect circuit, said latency counter adapted for being loaded with a value corresponding to the length of time estimated for execution of the first one of the instructions in response to receiving the clear signal.

13. An instruction scheduling apparatus, said apparatus comprising:

a dependency determination unit adapted to receive a plurality of instructions, determine that a second one of said instructions is dependent on a first one of said instructions, and generate dependency vectors for each instruction wherein the dependency vector for the second one of said instructions has a bit set that represents that the second one of said instructions is dependent on the first one of said instructions;

a waiting buffer coupled to the dependency determination unit and adapted to receive said plurality of instructions and to store said instructions pending dispatch for execution; and a dependency matrix coupled to the dependency determination unit and adapted to receive and store said dependency vectors, to schedule the first one of said instructions for execution in response to the corresponding dependency vector having no bits set, to clear the dependency vector of the second one of said instructions in response to the first one of said instructions being scheduled and prior to determination of source operands of the second instruction, and to schedule the second one of said instructions after a period of time corresponding to a length of time estimated for execution of the first one of said instructions.

14. An apparatus, as set forth in claim 13, wherein said dependency matrix includes a zero detect circuit coupled to the dependency vector of the first one of the instructions, and adapted to deliver a clear signal to the dependency vector of the second one of the instructions in response to determining that no bits are set in the dependency vector of the first one of the instructions.

15. An apparatus, as set forth in claim 14, wherein said dependency matrix includes a latency counter coupled to the zero detect circuit and adapted to receive the clear signal and delay its delivery to the dependency vector by a period of time corresponding to a length of time estimated for execution of the first one of the instructions.

16. An apparatus, as set forth in claim 15, wherein said latency counter includes a multi-bit shift register having its output coupled to a clear input of the dependency matrix, and an enable input coupled to the zero detect circuit, said latency counter adapted for being loaded with a value corresponding to the length of time estimated for execution of the first one of the instructions in response to receiving the clear signal.

* * * * *